(12) United States Patent
Shavit et al.

(10) Patent No.: US 6,934,741 B2
(45) Date of Patent: Aug. 23, 2005

(54) GLOBALLY DISTRIBUTED LOAD BALANCING

(75) Inventors: Nir N. Shavit, Cambridge, MA (US); Steven K. Heller, Acton, MA (US); Christine H. Flood, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 812 days.

(21) Appl. No.: 09/892,813

(22) Filed: Jun. 27, 2001

(65) Prior Publication Data

US 2003/0005114 A1 Jan. 2, 2003

(51) Int. Cl.[7] .......................................... G06F 15/167
(52) U.S. Cl. ..................................... 709/214; 718/100
(58) Field of Search ........................ 709/214, 217, 709/229; 707/206; 718/1, 100, 104, 106

(56) References Cited

U.S. PATENT DOCUMENTS

| | | | | |
|---|---|---|---|---|
| 4,907,151 A | * | 3/1990 | Bartlett ........................ | 711/166 |
| 5,088,036 A | * | 2/1992 | Ellis et al. ................... | 707/206 |
| 5,274,804 A | * | 12/1993 | Jackson et al. .............. | 707/206 |
| 5,446,901 A | * | 8/1995 | Owicki et al. ............... | 711/154 |
| 5,692,193 A | * | 11/1997 | Jagannathan et al. ........ | 718/106 |
| 6,253,215 B1 | * | 6/2001 | Agesen et al. ............... | 707/206 |
| 6,289,360 B1 | * | 9/2001 | Kolodner et al. ........... | 707/206 |
| 6,314,436 B1 | * | 11/2001 | Houldsworth ............... | 707/206 |
| 6,377,984 B1 | * | 4/2002 | Najork et al. ................ | 709/217 |
| 6,480,862 B1 | * | 11/2002 | Gall ............................. | 707/3 |
| 6,493,730 B1 | * | 12/2002 | Lewis et al. ................. | 707/206 |
| 6,542,911 B2 | * | 4/2003 | Chakraborty et al. ....... | 707/206 |
| 6,560,619 B1 | * | 5/2003 | Flood et al. ................. | 707/206 |
| 6,571,260 B1 | * | 5/2003 | Morris ......................... | 707/206 |
| 6,651,101 B1 | * | 11/2003 | Gai et al. ..................... | 709/224 |
| 6,671,707 B1 | * | 12/2003 | Hudson et al. .............. | 707/206 |
| 6,763,452 B1 | * | 7/2004 | Yates, Jr. et al. ............ | 712/227 |
| 2001/0049726 A1 | * | 12/2001 | Comeau et al. ............. | 709/218 |
| 2002/0052926 A1 | * | 5/2002 | Bush et al. ................... | 709/217 |
| 2002/0073103 A1 | * | 6/2002 | Bottomley et al. .......... | 707/200 |
| 2002/0095453 A1 | * | 7/2002 | Steensgaard ................. | 709/107 |
| 2003/0005025 A1 | * | 1/2003 | Shavit et al. ................ | 709/102 |
| 2003/0005029 A1 | * | 1/2003 | Shavit et al. ................ | 709/107 |
| 2004/0088702 A1 | * | 5/2004 | Garthwaite et al. ......... | 718/100 |

OTHER PUBLICATIONS

Craig et al, "nonProtean: Scalable System software for a Gigabit active Router", 2001; IEEE INFOCOM 2001, pp. 51–59.*
Patel et al, "A Model Completion Queue Mechanisms using the Virtual Interface API", 2000, IEEE, pp. 280–288.*
Youn et al, "A Multithreaded Architecture for the Efficient Execution of Vector Computations within a Loop using Status Field", 1996, IEEE, pp. 343–350.*
Washabaugh et al, "Incremental Garbage collection of Concurrent Objects", 1990, IEEE, pp. 21–30.*
Leslie Lamport, Providing the Correctness of Multiprocess Programs, IEEE Transaction on Software Engineering, vol. SE–3, No. 2, Mar. 1977, pp. 125–143.

* cited by examiner

Primary Examiner—Bunjob Jaroenchonwanit
(74) Attorney, Agent, or Firm—Kudirka & Jobse, LLP

(57) ABSTRACT

A garbage collector employs a plurality of task queues for a parallel-execution operation in a garbage-collection cycle. Each task queue is associated with a different ordered pair of the threads that perform the parallel-execution operation in parallel. One of the threads, referred to as that task queue's "enqueuer" thread, is the only one that can "push" onto that queue an identifier of a dynamically identified task. The other thread, referred to as that task queue's "dequeuer," is the only one that can "pop" tasks from that task queue for execution. Since, for each task queue, there is only one thread that can "push" task identifiers on to it and only one thread that can "pop" task identifiers from it, the garbage collector can share dynamically identified tasks optimally among its threads without suffering the cost imposed by making combinations of otherwise separate machine instructions atomic.

45 Claims, 9 Drawing Sheets

| ENQUEUER: | P0 | P1 | P2 | P3 |
|---|---|---|---|---|
| | pcb[0,0] | pcb[0,1] | pcb[0,2] | pcb[0,3] |

DE-QUEU-ER:

P0

| pcb[0,0] | pcb[0,1] | pcb[0,2] | pcb[0,3] |
|---|---|---|---|
| in = 3 | in = 1 | in = 3 | in = 2 |
| out = 0 | out = 0 | out = 0 | out = 0 |
| buff[0] = *A0 | buff[0] = *B0 | buff[0] = *C0 | buff[0] = *D0 |
| buff[1] = *A4 | | buff[1] = *C4 | buff[1] = *D4 |
| buff[2] = *A8 | | buff[2] = *C8 | |
| . | . | . | . |
| buff[PCB_SIZE-1] | buff[PCB_SIZE-1] | buff[PCB_SIZE-1] | buff[PCB_SIZE-1] |

P1

| pcb[1,0] | pcb[1,1] | pcb[1,2] | pcb[1,3] |
|---|---|---|---|
| in = 3 | in = 1 | in = 3 | in = 2 |
| out = 0 | out = 0 | out = 0 | out = 0 |
| buff[0] = *A1 | buff[0] = *B1 | buff[0] = *C1 | buff[0] = *D1 |
| buff[1] = *A5 | | buff[1] = *C5 | buff[1] = *D5 |
| buff[2] = *A9 | | buff[2] = *C9 | |
| . | . | . | . |
| buff[PCB_SIZE-1] | buff[PCB_SIZE-1] | buff[PCB_SIZE-1] | buff[PCB_SIZE-1] |

P2

| pcb[2,0] | pcb[2,1] | pcb[2,2] | pcb[2,3] |
|---|---|---|---|
| in = 2 | in = 1 | in = 2 | in = 2 |
| out = 0 | out = 0 | out = 0 | out = 0 |
| buff[0] = *A2 | buff[0] = *B2 | buff[0] = *C2 | buff[0] = *D2 |
| buff[1] = *A6 | | buff[1] = *C6 | buff[1] = *D6 |
| . | . | . | . |
| buff[PCB_SIZE-1] | buff[PCB_SIZE-1] | buff[PCB_SIZE-1] | buff[PCB_SIZE-1] |

P3

| pcb[3,0] | pcb[3,1] | pcb[3,2] | pcb[3,3] |
|---|---|---|---|
| in = 2 | in = 1 | in = 2 | in = 2 |
| out = 0 | out = 0 | out = 0 | out = 0 |
| buff[0] = *A3 | buff[0] = *B3 | buff[0] = *C3 | buff[0] = *D3 |
| buff[1] = *A7 | | buff[1] = *C7 | buff[1] = *D7 |
| . | . | . | . |
| buff[PCB_SIZE-1] | buff[PCB_SIZE-1] | buff[PCB_SIZE-1] | buff[PCB_SIZE-1] |

```
1   static void enque(ParallelThread *pt, java_lang_Object *v) {
2          int p = pt->number; /* process id */
3          sq_nexts *local = (sq_nexts *) pt->data1; /* local is local to thread p */
4          while (PCBfull(Q->pcb[local->nextpush,p])) {
5                 local->nextpush = mod(local->nextpush + 1, n)
6          }
7          PCBpush(v,Q->pcb[local->nextpush,p]); /* push item */
8          local->nextpush = mod(local->nextpush + 1, n);
9   }

1   typedef struct {
2          int in; /* counter of total number of elements inserted into PCB */
3          int out; /* counter of total number of elements deleted from the PCB */
4          java_lang_Object *buff[PCB_SIZE]; /* the PCB buffer, which is ``circular''*/
5   } PCB;

1   static bool_t PCBfull(PCB *b) {
2          if (mod(b->in - b->out, PCB_SIZE) == PCB_SIZE - 1) /* leave empty space */
3          return TRUE;
4          else return FALSE;
5   }

1   static PCBpush(java_lang_Object *v, PCB *b) {
2          b->buff[b->in] = v;
3          b->in = mod(b-> in + 1, PCB_SIZE);
4   }

1   static int mod(int x, int n){
2          while(x >= n) x = x - n;
3          while(x < 0) x = x + n;
4          return x;
5   }
```

Fig. 7

```
1    static java_lang_Object *deque(ParallelThread *pt){
2        int p = pt->number; /* process id */
3        sq_nexts *local = (sq_nexts *) pt->data1; /* local is local to thread p */
4        int j;
5        const term_limit = 2*n; /* limit set after which termination is attempted */
6        while (PCBempty(Q->pcb[p,local->nextpop])) {
7            local->nextpop = mod(local->nextpop + 1,n);
8            local->empty_count = local->empty_count+1;
9            if (local->empty_count == term_limit) {
10               local->status = inactive;
11               for(j=0; j=n-1; j++) {
12                   if (! PCBempty(Q->pcb[j,p]))
13                       local->status = active;
14               }
15               if (local->status == inactive)
16                   mark_self_inactive(p,&statusBitmap);
17               if (!StatusBitmap) /* all threads are inactive, return */
18                   return NULL; /* system termination state reached */
19               else local->empty_count = 0;
20           }
21       }
22       if (local->status == inactive){
23           local->status = active;
24           mark_self_active(p,&statusBitmap);
25       }
26       int pop = local->nextpop;
27       local->nextpop = mod(local->nextpop + 1, n);
28       return PCBpop(Q->pcb[p,pop]);
29   }

1    static bool_t PCBempty(PCB *b) {
2        return (b->in == b->out);
3    }

1    static java_lang_Object *PCBpop(PCB *b) {
2        java_lang_Object *v;
3        v = b->buff[b->out];
4        b->out = mod(b->out +1, PCB_SIZE);
5        return v;
6    }
```

Fig. 9

```
1   static void mark_self_inactive(int self, int *pStatusBitmap) {
2       int oldValue,newValue;
3       do {
4           oldValue = *pStatusBitmap;
5           newValue = oldValue & (~(1<<self));
6           newValue = casInt(newValue, oldValue, pStatusBitmap);
7       } while (newValue != oldValue) ;
8   }

1   static void mark_self_active(int self, int *pStatusBitmap) {
2       int oldValue,newValue;
3       do {
4           oldValue = *pStatusBitmap;
5           newValue = oldValue | (1<<self);
6           newValue = casInt(newValue, oldValue, pStatusBitmap);
7       } while (newValue != oldValue) ;
8   }
```

Fig. 10

GLOBALLY DISTRIBUTED LOAD BALANCING

CROSS-REFERENCE TO RELATED APPLICATIONS

This application is related to commonly assigned U.S. patent applications of Nir N. Shavit et al. for Termination Detection for Shared-Memory Parallel Programs and Load-Balancing Queues Employing LIFO/FIFO Work Stealing, both of which were filed on the same date as this application and are hereby incorporated by reference.

BACKGROUND OF THE INVENTION

1. Field of the Invention

The present invention is directed to multi-threaded operation in computer systems. It particularly concerns how to allocate tasks among different threads.

2. Background Information

Modern computer systems provide for various types of concurrent operation. A user of a typical desktop computer, for instance, may be simultaneously employing a word-processor program and an e-mail program together with a calculator program. The user's computer could be using several simultaneously operating processors, each of which could be operating on a different program. More typically, the computer employs only a single main processor, and its operating-system software causes that processor to switch from one program to another rapidly enough that the user cannot usually tell that the different programs are not really executing simultaneously. The different running programs are usually referred to as "processes" in this connection, and the change from one process to another is said to involve a "context switch." In a context switch one process is interrupted, and the contents of the program counter, call stacks, and various registers are stored, including those used for memory mapping. Then the corresponding values previously stored for a previously interrupted process are loaded, and execution resumes for that process. Processor hardware and operating-system software typically have special provisions for performing such context switches.

A program running as a computer-system process may take advantage of such provisions to provide separate, concurrent "threads" of its own execution. In such a case, the program counter and various register contents are stored and reloaded with a different thread's value, as in the case of a process change, but the memory-mapping values are not changed, so the new thread of execution has access to the same process-specific physical memory as the same process's previous thread.

In some cases, the use of multiple execution threads is merely a matter of programming convenience. For example, compilers for various programming languages, such as the Java programming language, readily provide the "housekeeping" for spawning different threads, so the programmer is not burdened with handling the details of making different threads' execution appear simultaneous. In the case of multiprocessor systems, though, the use of multiple threads has speed advantages. A process can be performed more quickly if the system allocates different threads to different processors when processor capacity is available.

To take advantage of this fact, programmers often identify constituent operations with their programs that particularly lend themselves to parallel execution. When program execution reaches a point where the parallel-execution operation can begin, it starts different execution threads to perform different tasks within that operation.

Now, in some parallel-execution operations the tasks to be performed can be identified only dynamically; that is, some of the tasks can be identified only by performing others of the tasks, so the tasks cannot be divided among the threads optimally at the beginning of the parallel-execution operation. Such parallel-execution operations can occur, for instance, in what has come to be called "garbage collection," which is the automatic reclamation of dynamically allocated memory. Byte code executed by a Java virtual machine, for instance, often calls for memory to be allocated for data "objects" if certain program branches are taken. Subsequently, a point in the byte-code program's execution can be reached at which there is no further possibility that the data stored in that dynamically allocated memory will be used. Without requiring the programmer to provide specific instructions to do so, the virtual machine executing the byte code automatically identifies such "unreachable" objects and reclaims their memory so that objects allocated thereafter can use it.

The general approach employed by the virtual machine's garbage collector is to identify all objects that are reachable and then reclaim memory that no such reachable object occupies. An object is considered reachable if it is referred to by a reference in a "root set" of locations, such as global variables, registers, or the call stack, that are recognized as being inherently reachable. An object is also reachable if it is referred to by a reference in a reachable object.

So reachable-object identification is a recursive process: the identification of a reachable object can lead to identification of further reachable objects. And, if every reachable object so far identified is thought of as representing a further task, namely, that of identifying any further objects to which it refers, it can be seen that parts of the garbage-collection process include tasks that are identifiable only dynamically. If those tasks are properly programmed, they can be performed in an essentially parallel manner. Specifically, the initial, statically identifiable members of the root set can be divided among a plurality of threads (whose execution will typically be divided among many processors), and those threads can identify reachable objects in parallel.

Now, each thread could maintain a list of the tasks that it has thus identified dynamically, and it could proceed to perform all tasks that it has thus identified. But much of the advantage of parallel processing may be lost if each thread performs only those tasks that it has itself identified. That is, one thread may encounter a number of objects that have a large number of references, while others may not. This leaves one thread with many more tasks than the others, so there would be a significant amount of time during which the other threads will have finished all of their tasks in the parallel-execution operation, while another thread still has most of its tasks yet to be performed.

As a consequence, such parallel-execution operations are usually so arranged that each thread can perform tasks that other threads have identified. Conventionally, though, this has usually meant that access to the queues that contain identifiers of those tasks needs to be made "thread safe." Thread safety in most cases can be afforded only by performing atomically sets of machine instructions that could normally be performed separately. Particularly in the multiprocessor systems in which parallel execution is especially advantageous, performing such "atomic" operations is quite expensive. So the need for thread safety tends to compromise some of a multiprocessor system's advantages.

SUMMARY OF THE INVENTION

We have invented a way of dividing dynamically allocated tasks among separate threads in such a way as virtually to avoid the expensive atomic operations that thread safety normally requires. In accordance with this invention, the computer system provides a plurality of task queues. Each queue is associated with a different ordered pair of the threads that are to perform the parallel-execution operation. We call one thread of the ordered pair the "enqueuer" of the queue associated with the ordered pair, and we call the other thread of the ordered pair the "dequeuer." When a thread identifies a task, it pushes an identifier of that task onto one or more of the queues of which that thread is an enqueuer. When a thread needs a new tasks to perform, it pops a task identifier from a queue of which it is the dequeuer. For each queue, that is, there is only one thread that pushes task identifiers onto it and only one that pops those identifiers from it. As will be shown below, this enables the most-common accesses to those queues to be made thread safe without resorting to atomic operations. It thus eliminates the performance cost that attends such operations.

BRIEF DESCRIPTION OF THE DRAWINGS

The invention description below refers to the accompanying drawings, of which:

FIG. 6 is a block diagram of a task-queue array employed by the illustrated embodiment of the present invention;

FIG. 7 is a source-code listing of routines employed by a thread in adding a task-identifier entry to one of the task queues of FIG. 6;

FIG. 9 is a source-code listing of routines employed by an execution thread in "popping" tasks from the task-queue array of FIG. 6; and FIG. 10 is a source-code listing of routines employed by the execution threads in support of the termination-protection approach that the illustrated embodiment employs.

DETAILED DESCRIPTION OF AN ILLUSTRATIVE EMBODIMENT

Figure 1:
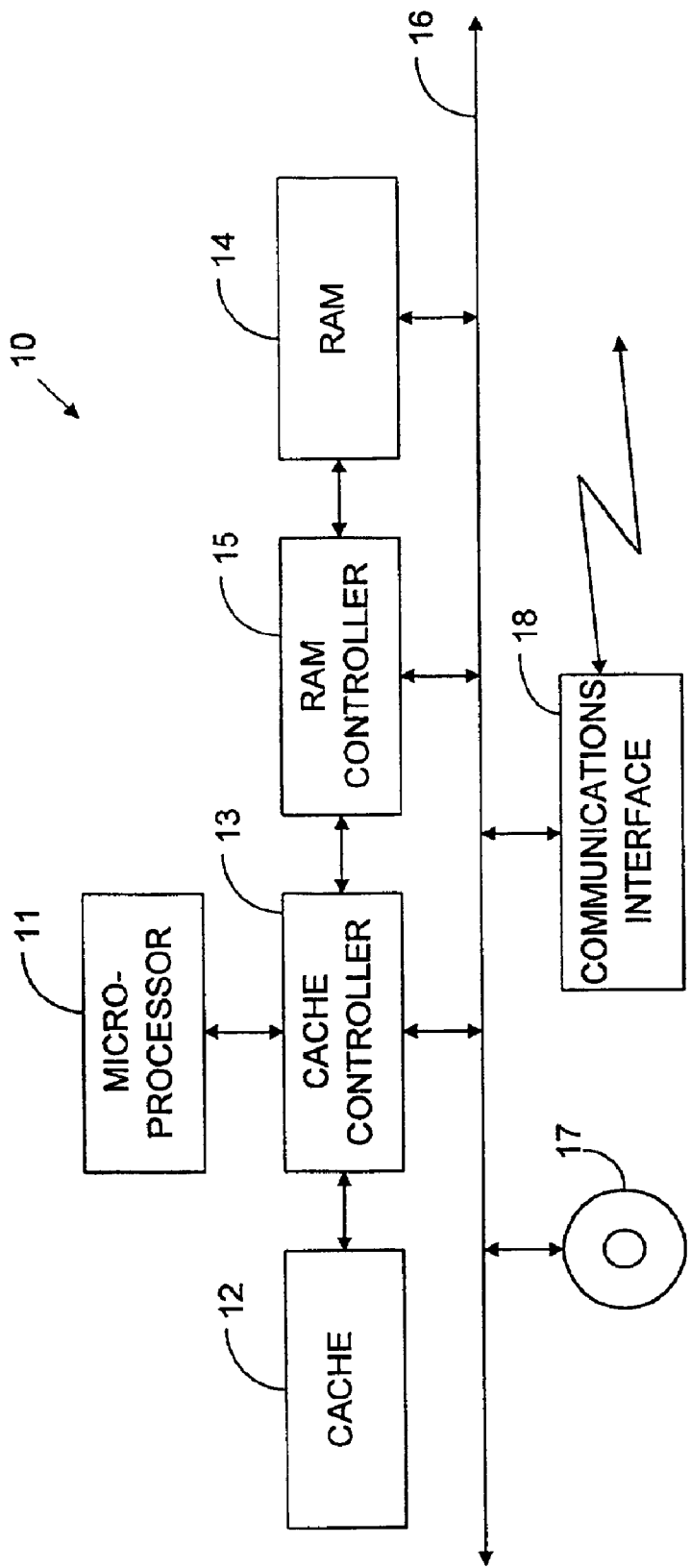
FIG. 1 is a block diagram of a typical uniprocessor computer system.

The present invention's teachings concerning task allocation in parallel-execution operations operation can be implemented in a wide variety of systems. Some of the benefits of employing multiple threads can be obtained in uniprocessor systems, of which FIG. 1 depicts a typical configuration. Its uniprocessor system 10 employs a single microprocessor such as microprocessor 11. In FIG. 1's exemplary system, microprocessor 11 receives data, and instructions for operating on them, from on-board cache memory or further cache memory 12, possibly through the mediation of a cache controller 13. The cache controller 13 can in turn receive such data from system read/write memory ("RAM") 14 through a RAM controller 15, or from various peripheral devices through a system bus 16.

The RAM 14's data and instruction contents, which can configure the system to implement the teachings to be described below, will ordinarily have been loaded from peripheral devices such as a system disk 17. Other sources of such RAM contents include communications interface 18, which can receive instructions and data from other computer equipment.

Although such systems can implement threads generally and therefore the present invention's teachings in particular, the application in connection with which the present invention is described by way of example below would more frequently be implemented in a multiprocessor system. Such systems come in a wide variety of configurations. Some may be largely the same as that of FIG. 1 with the exception that they could include more than one microprocessor such as processor 11, possibly together with respective cache memories, sharing common read/write memory by communication over the common bus 16.

Figure 2:
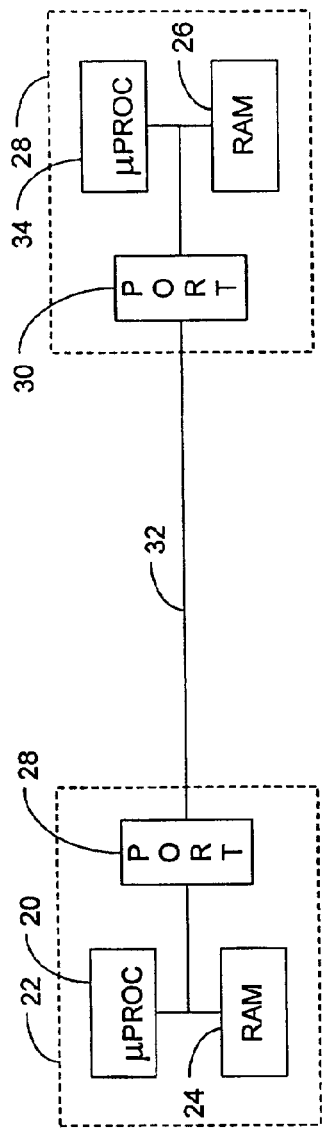
FIG. 2 is a block diagram of one type of multiprocessor computer system.

In other configurations, parts of the shared memory may be more local to one or more processors than to others. In FIG. 2, for instance, one or more microprocessors 20 at a location 22 may have access both to a local memory module 24 and to a further, remote memory module 26, which is provided at a remote location 28. Because of the greater distance, though, port circuitry 28 and 30 may be necessary to communicate at the lower speed to which an intervening channel 32 is limited. A processor 34 at the remote location may similarly have different-speed access to both memory modules 24 and 26. In such a situation, one or the other or both of the processors may need to fetch code or data or both from a remote location, but it will often be true that parts of the code will be replicated in both places.

Regardless of the configuration, different processors can operate on the same code, although that code may be replicated in different physical memory, so different processors can be used to execute different threads of the same process.

To illustrate the invention, we will describe its use by a garbage collector. To place garbage collection in context, we briefly review the general relationship between programming and computer operation. When a processor executes a computer program, of course, it executes machine instructions. A programmer typically writes the program, but it is a rare programmer who is familiar with the specific machine instructions in which his efforts eventually result. More typically, the programmer writes higher-level-language "source code," from which a computer software-configured to do so generates those machine instructions, or "object code."

Figure 3:
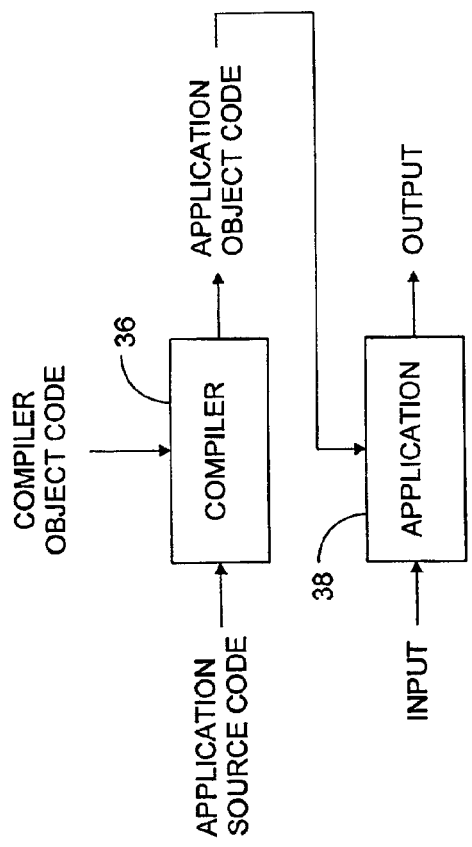
FIG. 3 is a block diagram that illustrates a relationship between source code and object code.

FIG. 3 represents this sequence. FIG. 3's block 36 represents a compiler process that a computer performs under the direction of compiler object code. That object code is typically stored on a persistent machine-readable medium, such as FIG. 1's system disk 17, and it is loaded by transmission of electrical signals into RAM 15 to configure the computer system to act as a compiler. But the compiler object code's persistent storage may instead be provided in a server system remote from the machine that performs the compiling. The electrical signals that carry the digital data by which the computer systems exchange the code are exemplary forms of carrier waves transporting the information.

In any event, the compiler converts source code into application object code, as FIG. 3 indicates, and places it in machine-readable storage such as RAM 15 or disk 17. A computer will follow that object code's instructions in performing the thus-defined application 38, which typically generates output from input. The compiler 36 can itself be thought of as an application, one in which the input is source code and the output is object code, but the computer that executes the application 28 is not necessarily the same as the one that executes the compiler application 36.

The source code need not have been written by a human programmer directly. Integrated development environments often automate the source-code-writing process to the extent that for many applications very little of the source code is produced "manually." As will be explained below, moreover, the "source" code being compiled may sometimes be low-level code, such as the byte-code input to the Java™ virtual machine, that programmers almost never write directly. (Sun, the Sun Logo, Sun Microsystems, and Java are trademarks or registered trademarks of Sun Microsystems, Inc., in the United States and other countries.) And, although FIG. 3 may appear to suggest a batch process, in which all of an application's object code is produced before any of it is executed, the same processor may both compile and execute the code, in which case the processor may execute its compiler application concurrently with—and, indeed, in a way that can depend upon—its execution of the compiler's output object code.

So the sequence of operations by which source code results in machine-language instructions may be considerably more complicated than one may infer from FIG. 3. To give a sense of the complexity that can be involved, we discuss by reference to FIG. 4 an example of one way in which various levels of source code can result in the machine instructions that the processor executes. The human application programmer produces source code 40 written in a high-level language such as the Java programming language. In the case of the Java programming language, a compiler 42 converts that code into "class files." These predominantly include routines written in instructions, called "byte code" 44, for a "virtual machine" that various processors can be programmed to emulate. This conversion into byte code is almost always separated in time from that code's execution, so that aspect of the sequence is depicted as occurring in a "compile-time environment" 46 separate from a "run-time environment" 48, in which execution occurs.

Figure 4:
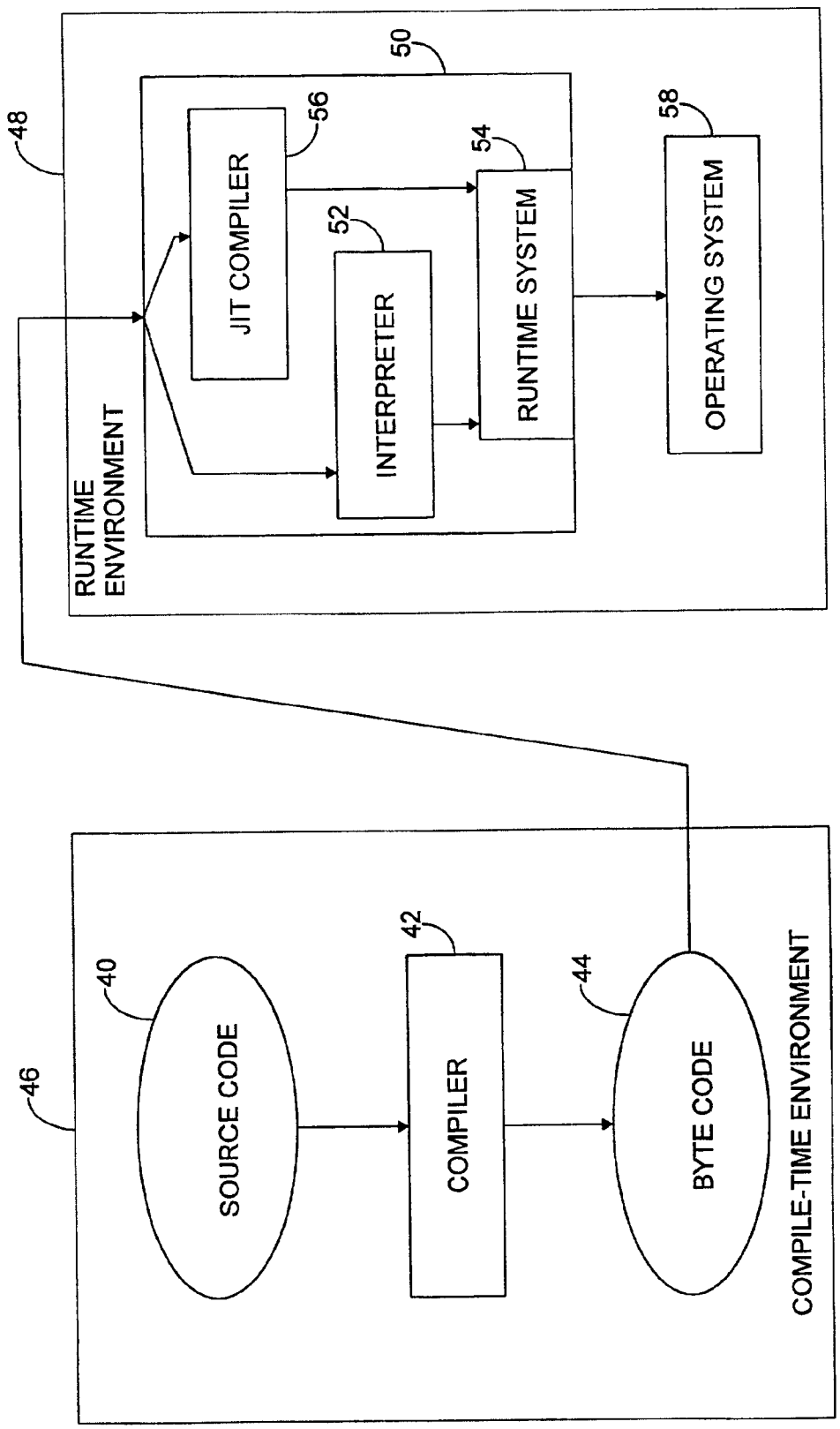
FIG. 4 is a block diagram of a more-complicated relationship between source code and object code.

Most typically, a processor runs the class files' instructions under the control of a virtual-machine program 50, whose purpose is to emulate a machine from whose instruction set the byte codes are drawn. Much of the virtual machine's action in executing the byte code is most like what those skilled in the art refer to as "interpreting," and FIG. 4 shows that the virtual machine includes an "interpreter" 52 for that purpose. The resultant instructions typically involve calls to a run-time system 54, which handles matters such as loading new class files as they are needed.

Many virtual-machine implementations also actually compile the byte code concurrently with the resultant object code's execution, so FIG. 4 depicts the virtual machine as additionally including a "just-in-time" compiler 56. It may be that the resultant object code will make low-level calls to the run-time system, as the drawing indicates. In any event, the code's execution will include calls to the local operating system 58.

In addition to class-file loading, one of the functions that the runtime system performs is garbage collection. As was mentioned above, a Java-language programmer will not ordinarily have explicitly written the programming that performs this function; the compiler/interpreter provides it automatically in response to the programming that the user has written. In doing so, the compiler/interpreter may include parallel-execution operations, and it is by reference to such operations that we will illustrate the present invention's approach to performing parallel-execution operations. To aid that discussion, we digress to a brief review of garbage-collection nomenclature.

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object may belong to a class, which is an organizational entity that may contain method code or other information shared by all objects belonging to that class. The specific use employed below to exemplify implementing the present invention's teachings with reclaiming memory allocated to Java-language objects, which belong to such classes.

A modern program executing as a computer-system process often dynamically allocates storage for objects within a part of the process's memory commonly referred to as the "heap." As was mentioned above, a garbage collector reclaims such objects when they are no longer reachable.

To distinguish the part of the program that does "useful" work from that which does the garbage collection, the term mutator is sometimes used; from the collector's point of view, what the mutator does is mutate active data structures' connectivity. Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object allocation includes steps for finding space occupied by objects whose reference count has fallen to zero. Obviously, such an approach can slow mutator operation significantly.

Other, "stop-the-world" garbage-collection approaches use somewhat less interleaving. The mutator still typically allocates an object some space within the heap by invoking the garbage collector. The garbage collector keeps track of the fact that the thus-allocated space is occupied, and it refrains from allocating that space to other objects until it determines that the mutator no longer needs access to that object. But a stop-the-world collector performs its memory reclamation during garbage-collection cycles separate from the cycles in which the mutator runs. That is, the collector interrupts the mutator process, finds unreachable objects, reclaims their memory space for reuse, and then restarts the mutator. (The mutator may actually be a multi-threaded program running on multiple processors, so stopping it is nontrivial, but we do not deal here with the way in which it is stopped, since we are concerned here only with what happens after the stopping has occurred.)

Figure 5:
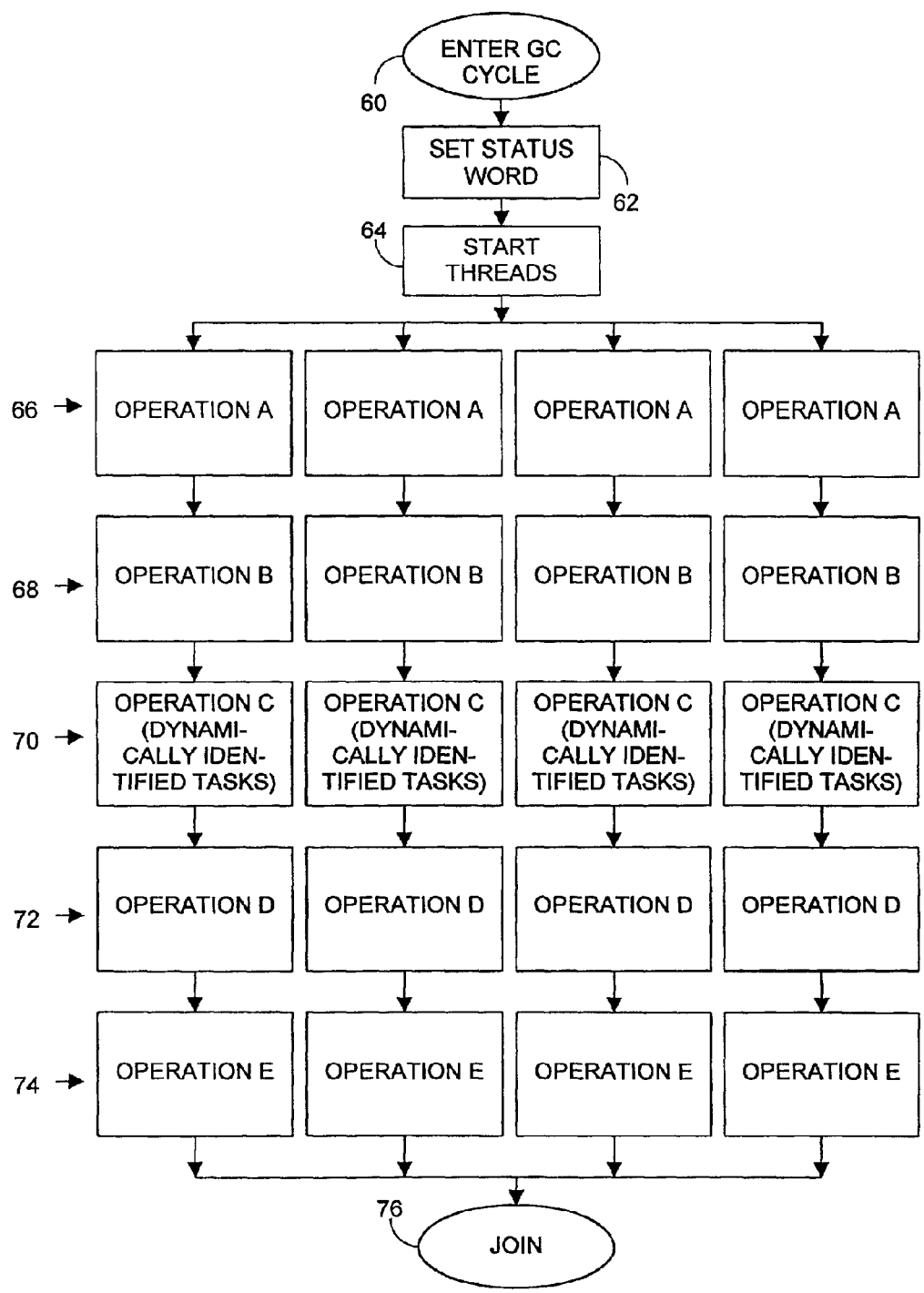
FIG. 5 is a flow chart that illustrates a sequence of parallel-execution operations.

To provide an example of a way in which the present invention's teachings can be applied, we assume a "stop-the-world" garbage collector and focus on the garbage-collection cycle. Since most of the specifics of a garbage-collection cycle are not of particular interest in the present context, FIG. 5 depicts only part of the cycle, and it depicts that part in a highly abstract manner. Its block 60 represents the start of the garbage-collection cycle, and its block 62 represents one of a number of the initial garbage-collection steps that are performed by a single thread only.

Eventually, the garbage collector reaches a part of its routine that can benefit from multi-threaded execution, and the virtual-machine programming calls upon the operating system to start a number of threads, as block 64 indicates, that will execute a subsequent code sequence in parallel. For the sake of example, we assume four threads. This would typically mean that the garbage collector is running in a multiprocessor system of at least that many processors, since the advantages of multithreading in an automatic-garbage-collection context are principally that different processors will at least sometimes execute different threads simultaneously.

Each of the threads executes an identical code sequence. The drawing depicts the code sequence somewhat arbitrarily as divided into a number of operations A, B, C, D, and E respectively represented by blocks 66, 68, 70, 72, and 74. These operations' specifics are not germane to the present discussion, but commonly assigned U.S. patent application Ser. No. 09/377,349, filed on Aug. 19, 1999, by Alexander T. Garthwaite for Popular-Object Handling in a Train-Algorithm-Based Garbage Collector and hereby incorporated by reference, gives examples of the types of garbage-collection operations that blocks 66, 68, 70, 72, and 74 may include.

Although all threads execute the same code sequence, some of the code's routines take the thread's identity as an argument, and some of the data that an instruction processes may change between that instruction's executions by different threads. These factors, together with hardware differences and the vagaries of thread scheduling, result in different threads' completing different operations at different times even in the absence of the dynamic task identification. For the sake of example, though, we assume that there is a point in the routine beyond which execution should not proceed until all threads have reached it, so the drawing includes a block 76 to represent a "join" mechanism for imposing this requirement. It is only after all threads reach the join point that further execution of the garbage-collection cycle can proceed.

As was mentioned above, the present invention's advantages are manifest when the parallel-execution operation includes dynamically identified tasks. So we will assume that FIG. 5's operation B involves essentially only statically identifiable tasks, whereas operation C's involve tasks principally identifiable only dynamically. For example, assume that operation B involves processing the root set to find reachable objects. The root set may be divided into groups, and different threads may claim different groups to process. Since those tasks' identities are known at the outset, the present invention's teachings are not needed to assign them to threads.

By performing those tasks, though, a garbage-collection thread dynamically identifies further tasks to perform: when operation B identifies an object referred to by the root set, it has also identified the task of following the references in the thus-identified object to find further roots. We will assume that operation C involves processing the reachable objects thus identified, so its tasks are identifiable only dynamically: since it is only by performing one of the tasks that further tasks are identified, the tasks are not known at the beginning of the operation. Because of the task-identification process's dynamic nature, operation C would be particularly vulnerable to a work imbalance among the threads if each thread performed only those tasks that it had originally identified itself. So the computer system instead enables different threads to perform tasks that other threads have identified.

To illustrate how this is accomplished in accordance with the present invention, let us assume that the computer system is a multiprocessor system that includes four separate processors P0, P1, P2, and P3, on each of which a separate thread executes. In the embodiment that FIG. 6 illustrates, the computer system keeps track of the identified tasks by employing a two-dimensional array 80 of task queues. Each task queue is of the producer/consumer, "Lamport queue" type (after the type of queue described in Lamport, "Proving the Correctness of Multiprocess Programs," IEEE *Transactions on Software Engineering*, vol. SE-3, no. 2, March 1977). Each is associated with an ordered pair of threads, the first thread in the ordered pair being called the "dequeuer," the second being called the "enqueuer." The task queues contain identifiers of tasks to be performed. In this case, the tasks are to process Java-language objects in order to, among other things, find any further objects to which those objects contain references, and FIG. 6 represents the entries for the sake of example as pointers to pointers to such objects.

FIG. 6 labels each of the task queues as an array element pcb[m,n], where m is the number of its dequeuer thread and n is the number of its enqueuer thread. The only thread that pushes task identifiers onto any given task queue is that queue's enqueuer thread, while the only thread that pops task identifiers from it is its dequeuer thread. For example, each task queue in the left column receives task identifiers only from the thread that executes on processor P0, while only the thread that executes on processor P2 pops task identifiers from the queues in the array's third row.

FIG. 6 illustrates this with a scenario in which the thread performed by processor P0 pushes the identifiers of objects A0–A9 onto successive ones of the first-column queues, of which it is the enqueuer. The thread that processor P1 executes pushes the identifiers of objects B0–B3 in a similar round-robin order onto the second-column queues. The threads executed by processors P2 and P3 similarly push object identifiers onto the third- and fourth-column queues.

The thread that processor P0 executes then pops the identifiers of objects A0, B0, C0, D0, A4, C4, D4, A8, and C8 in that order. The thread that processor P1 executes pops the identifiers of objects A1 B1, C1, D1, A5, C5, D5, A9, and C9. The thread that processor P2 executes pops the identifiers of objects A2, B2, C2, D2, A6, C6, and D6. And the thread executed by processor P3 pops the identifiers of objects A3, B3, C3, D3, A7, C7, and D7.

As FIG. 6 illustrates, this approach results in a relatively even distribution of tasks among threads even though there is a wide variation among the threads in the numbers of tasks that they have identified. Moreover, since each task queue has only one enqueuer and only one dequeuer, this approach avoids the expensive use of atomic operations that the need for thread safety could otherwise require. To show this, we start with FIG. 7, which is a listing of a type definition and three of the routines employed by a garbage-collection thread in pushing a task identifier onto a queue in FIG. 6's array 80.

Figure 8:
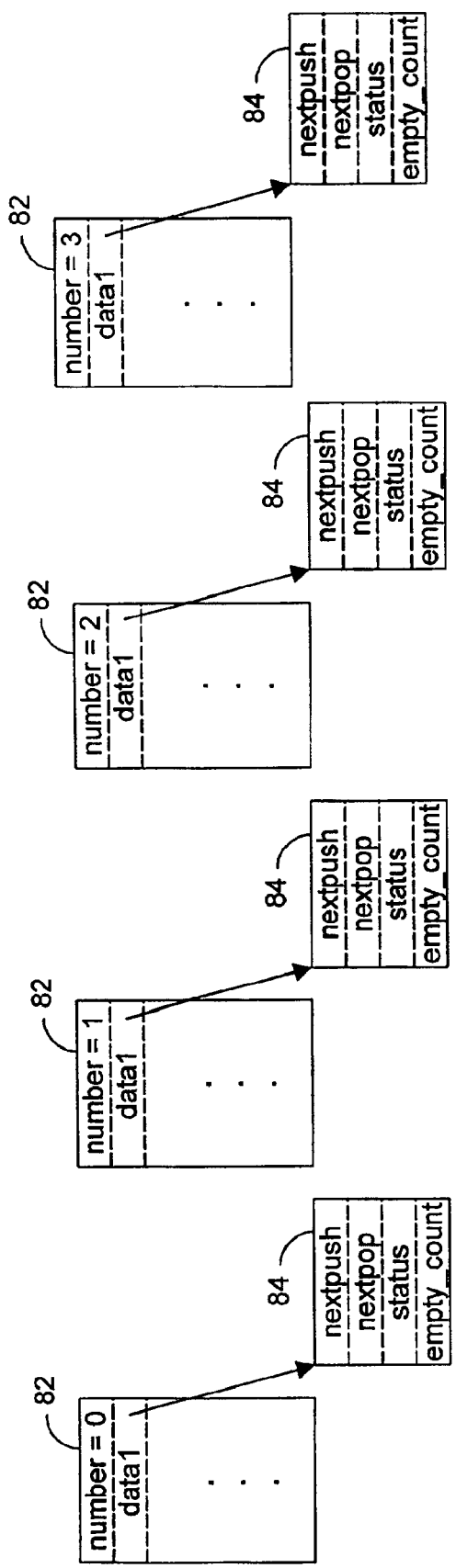
FIG. 8 is a data-structure diagram depicting data structures employed by respective execution threads in support of their use of FIG. 6's task-queue array.

The first routine, enque( ), receives as one parameter the identifier of a Java-language object identified as being reachable and thus requiring processing in order to determine whether it contains references to further objects, which would thereby also be reachable. That routine also receives as a parameter a pointer to the "execution environment" of the thread that has identified that object as reachable and thus as requiring processing to determine whether it contains references to other objects. The execution environment is a data structure, of type ParallelThread, whose data members represent various parameters associated with an execution thread. FIG. 8 depicts four such structures 82, one for each of four garbage-collection threads.

As the enque( ) listing's second line indicates, that routine reads from the executing thread's execution environment 82 (FIG. 8) a "number" parameter, which is an index that identifies the thread associated with that execution environment. As that listing's third line indicates, it also obtains from the executing thread's execution environment the value of a pointer to a data structure 84 (FIG. 8) that contains parameters related to that thread's use of FIG. 6's task-queue array 80. Among those parameters is "nextpush." Of the queues for which the executing thread is the enqueuer, the "nextpush" value identifies the one that is to be the next in the round-robin sequence of queues on which the executing thread is to push a task identifier.

The enque( ) routine's fourth line represents calling a PCBfull( ) routine to determine whether that next queue is full. The determination of whether that queue is full is relatively simple. As FIG. 6 shows, each of the queues in FIG. 6's array 80 of task queues is the buff[ ] member of a structure that also includes "in" and "out" members, which respectively specify the locations in that array onto which and from which the next items are respectively to be pushed and popped. As the PCBfull( ) routine's listing (FIG. 7) indicates, that routine determines whether that task queue is full simply by comparing the "in" and "out" members to determine whether the former is (circularly) about to overtake the latter. To prevent an empty queue from being confused with a full one, the illustrated embodiment considers a queue to be full if it has (only) one or two empty slots.

As the enque( ) routine's fourth through sixth lines indicate, that routine advances circularly through the queues of which the executing thread is the enqueuer until it finds one that is not full. As the seventh line indicates, it then calls FIG. 7's PCBpush( ) routine. That routine's listing shows that it places the object's identifier into the queue location represented by that queue's "in" value, which is then advanced circularly. Having thus pushed an entry onto one of the queues of which the executing thread is the enqueuer, the enque( ) routine then circularly advances the executing thread's "nextpush" value, as its eighth line indicates, so that its next push attempt will occur at the next one of the task queues of which the executing thread is the enqueuer.

This completes the operation of adding a task identifier to the task-queue array. Note that the sample code imposes no requirement for atomically performing sets of machine instructions that ordinarily are performed separately. We discuss why that is after we review FIG. 9's deque( ) routine.

The deque( ) routine is the one that a garbage-collection thread employs to pop a task identifier from FIG. 6's task-queue array 80. The third line in that routine's listing represents copying from a field in the executing thread's execution environment 82 (FIG. 8) a pointer to a data structure 84 that contains parameters associated with that thread's use of FIG. 6's task-queue array 80. Its sixth line represents obtaining the value of that structure's "nextpop" field, using it to select one of the queues for which the executing thread is the dequeuer, and determining whether that queue is empty.

As FIG. 9's PCBempty( ) routine indicates, that determination is made by simply comparing the encompassing PCB structure's "in" value with its "out" value. If the task queue thus selected is not empty, the deque( ) routine skips the block represented by its sixth through twenty-first lines and performs its twenty-second line's step. In that step it determines whether there is an inactivity-indicating value in the "status" field of FIG. 8's data structure 84 associated with the executing thread. Ordinarily, that field instead indicates an active value. So, as the twenty-sixth through twenty-eighth lines indicate, the deque( ) routine in most cases simply returns the object identifier produced by performing FIG. 9's PCBpop( ) routine and circularly incrementing the "nextpop" value. The PCBpop( ) routine merely retrieves the object identifier contained in the task-queue location specified by its "out" field and circularly advances that field's value.

Now, as was stated above, only one dequeuer thread is associated with each task queue—i.e., no other thread will perform the deque( ) routine on that same task queue—so no other thread can modify that task queue's "out" field. As was also stated above, though, there is one other thread, namely, that task queue's enqueuer thread, that also has access to that task queue's "out" field: by performing the PCBfull( ) routine (FIG. 7) on that task queue, the enqueuer thread compares that field's contents with the contents of that task queue's "in" field to determine whether the queue is full and the enqueuer should therefore refrain from adding an entry to it. Thus basing a decision on a comparison of fields to which different threads have access would ordinarily necessitate making the comparison atomic with the loading of the values to be compared.

But the present invention makes this unnecessary. In the first place, since the task queue's enqueuer thread is the only one that can modify that queue's "in" field, the thread performing the enque( ) routine—i.e., the task queue's sole enqueuer thread—always "knows" what the current contents of that task queue's "in" field are. This does not mean that the outcome of the PCBfull( ) routine always correctly indicates whether the task queue is full; in popping a task from that task queue, that dequeuer of task queue could have removed a task between the enqueuer's reading of the "out" value and the resultant comparison with the "in" value in the course of performing the PCBfull( ) routine. But the resultant error would be harmless; it would only cause the enqueuer to look for a different queue onto which to push the task identifier.

There is a similar lack of harm in the deque( ) routine resulting from the fact that the PCBempty( ) routine's loading of the "in" value is not atomic with its use of that value in a comparison. The possible erroneous conclusion would only be that the queue is empty when it is not, and such a conclusion would just cause the dequeuer thread to search for a task in the next task queue of which that thread is a dequeuer. So the present invention affords concurrent task-queue access without requiring an atomic operation. It therefore greatly reduces the cost that sharing work among threads would otherwise impose.

Now, there are circumstances in which FIG. 9's deque( ) routine does necessitate atomic operations. As will now be explained, though, the atomic operations occur only because of the particular termination-detection approach that the illustrated embodiment employs. And a dequeuing thread reaches the part of the deque( ) routine in which the atomic-operation use occurs only, after repeated failures to find a queue in which any task identifier remains, it needs to determine whether all of the parallel-execution operation's tasks have already been completed.

The block represented by the deque( ) routine's sixth through twenty-first lines is repeated until the deque( ) routine either finds a task queue in which task identifiers remain or determines that the parallel-execution operation has been completed. As the sixth and seventh lines indicate, the thread circularly increments its "nextpop" field's value if the task queue specified by that field's current value is empty. As will be apparent shortly, this ordinarily results in the thread's looping to determine whether the task queue specified by the now-incremented "nextpop" value is empty, too.

But the routine needs to prevent a situation in which it loops endlessly because all the task queues for which the executing thread is the dequeuer are empty. To this end, it performs the eighth-line step of incrementing the value in the "empty_count" field of FIG. 8's data structure 84 associated with the executing thread. (This value will have been initialized to a value of zero at the beginning of the garbage-collection cycle.) If, as tested in the ninth-line step, the thus-incremented "empty_count" value has not exceeded a constant "term_limit" value—which was set in the fifth-line step to twice the number of garbage-collection threads—then the routine returns to the sixth-line step, in which it determines whether the next task queue is empty.

If the "empty_count" value reaches the "term_limit" value, on the other hand, then the routine embarks on a determination of whether the entire parallel-execution operation is actually complete. This happens after deque( ) has cycled twice through all of the task queues of which the executing thread is a dequeuer and found those task queues empty in every case. When this happens, the executing thread performs the tenth-line step of setting to an inactivity-indicating value the "status" field of FIG. 8's data structure 84 corresponding to the executing thread. In the block represented by the eleventh through fourteenth lines, though, it returns that field to an activity-indicating value if any queue of which the executing thread is an enqueuer is not empty.

As the fifteenth and sixteenth lines indicate, it is only if that "status" field still has an inactivity-indicating value after that block's execution that the system resorts to an atomic operation. Specifically, it performs the sixteenth line's step of calling FIG. 10's mark_self_inactive( ) routine. It passes that routine the executing thread's identifying index and a pointer to a common status word, "statusBitmap," to which all of the threads are accorded access. The "statusBitmap" variable can be thought of as a bit field in which different bits correspond to the different simultaneously executing garbage-collection threads. Together these bits represent the activity status of all the garbage-collection threads. The purpose of the mark_self_inactive( ) routine is to reset to zero the bit in "statusBitmap" that corresponds to the executing thread. To do this, that routine initially copies the value of "statusBitmap" into a local "oldValue" variable, as its listing's fourth line indicates. The listing's fifth line represents the step of setting the contents of a "newValue" variable to the result of resetting to zero the bit of "oldValue" that corresponds to the executing thread.

Now, simply writing the value of this "newValue" variable back into the common "statusBitmap" location can have undesirable consequences. If some other thread has changed its own bit in that location between the executing thread's reading of that value and its writing a changed value into it, the executing thread's writing of the changed value into the common status word would not only change the executing thread's own bit but also, undesirably, return the other thread's bit back to its previous value. So the mark_self_inactive( ) routine calls a casInt( ) routine, as the mark_self_inactive( ) routine's sixth line indicates, to avoid such an untoward result.

The casInt( ) routine is an atomic compare-and-swap operation. A compare-and swap operation reads a target location's value and compares that value with an "old value" parameter. If they are the same, it swaps the contents of the target location (in this case, the "statusBitmap" location) with those of its "new value" parameter. Otherwise, it does not perform the swap. In this case, in other words, the casInt( ) routine does not change the common status word unless, when that atomic operation starts, the contents of the status word have not changed since the mark_self_inactive( ) routine initially read them in the process of creating the value of its "oldValue" parameter. As that routine's third through seventh lines indicate, the reading of the status word and the attempt to change it in an atomic operation keep repeating until the seventh line's step determines that the atomic operation has been completed successfully.

As the seventeenth and eighteenth lines of FIG. 9's deque( ) routine indicate, that routine returns a NULL value, indicating that the parallel-execution operation has been completed, if all threads have thus set their respective status-word bits to zeros. The deque( ) routine's caller concludes from a NULL return value that the parallel-execution operation has been completed, and it can therefore move on to further operations. If not all of StatusBitmap's bits are zero, on the other hand, the deque( ) routine resets to zero the "empty_count" field in FIG. 8's data structure 84 corresponding to the executing thread. The routine then returns to cycling through the task queues of which the executing thread is the dequeuer. The cycling continues until that routine finds a non-empty task queue or again interrupts itself to determine whether the parallel-execution operation has in fact been completed.

If, during this process, the routine does find a task queue that is not empty, it escapes the loop of the sixth through twenty-first lines. This results in its executing the block set forth in the twenty-second through twenty-fifth lines. In that block, if the executing thread's bit in StatusBitmap is zero (as indicated by an inactivity-indicating value of the "status" field in the executing thread's data structure 84 in FIG. 8), it sets that bit to a one value by calling mark_self_active( ) routine, as the twenty-fourth line indicates.

FIG. 10 shows that this routine is essentially the same as the mark_self_inactive( ) routine, with the exception that it sets the corresponding value to one rather than to zero. So that routine, too, requires an atomic operation. Again, though, this atomic operation is encountered only as part of the particular termination-detection approach that the illustrated embodiment employs; it is not necessitated by different threads' access to common task queue.

So the present invention enables different threads to share dynamically identified tasks optimally without, in most cases, exacting the performance cost that the use of atomic operations can impose. It thus constitutes a significant advance in the art.

What is claimed is:

1. A computer system that employs a plurality of execution threads to perform tasks that the threads identify dynamically, the computer system being so programmed as to:
   A) provide a plurality of task queues, each of which is associated with a different ordered pair of the threads, one thread of the ordered pair being denominated the enqueuer of that queue and the other being denominated the dequeuer thereof, wherein the execution threads operate so that only an enqueuer of a task queue adds entries to that task queue and only the dequeuer of a task queue removes entries from that task queue;
   B) when a thread identifies a task, push an identifier of the task thus identified onto a set of at least one of the queues of which that thread is an enqueuer; and
   C) when a thread requires one of the dynamically identified tasks to perform, cause that thread to perform a task identified by a task identifier fetched by that thread from a task queue of which that thread is the dequeuer.

2. A computer system as defined in claim 1 wherein each said dynamically identified task is the garbage-collection task of performing, for a given object associated with that task, processing that includes identifying in the given object references to other objects and thereby identifying the tasks of performing similar processing for those other objects.

3. A computer system as defined in claim 1 wherein each said task identifier is an identifier of the object with which the task is associated.

4. A computer system as defined in claim 3 wherein each said dynamically identified task is the garbage-collection task of performing, for a given object associated with that task, processing that includes identifying in the given object references to other objects and thereby identifying the tasks of performing similar processing for those other objects.

5. A computer system as defined in claim 3 wherein each said task identifier is a pointer to the object with which the task is associated.

6. A computer system as defined in claim 1 wherein, when one said thread identifies a task, the computer system pushes an identifier of that thread onto only one of the queues of which that thread is an enqueuer.

7. A computer system as defined in claim 6 wherein each said dynamically identified task is the garbage-collection task of performing, for a given object associated with that task, processing that includes identifying in the given object references to other objects and thereby identifying the tasks of performing similar processing for those other objects.

8. A computer system as defined in claim 1 wherein identifiers of tasks successively identified by a given thread are not in general pushed onto the same queue.

9. A computer system as defined in claim 8 wherein each said dynamically identified task is the garbage-collection task of performing, for a given object associated with that task, processing that includes identifying in the given object references to other objects and thereby identifying the tasks of performing similar processing for those other objects.

10. A computer system as defined in claim 1 wherein a task queue is provided for each ordered pair of the threads.

11. A computer system as defined in claim 10 wherein each said dynamically identified task is the garbage-collection task of performing, for a given object associated with that task, processing that includes identifying in the given object references to other objects and thereby identifying the tasks of performing similar processing for those other objects.

12. For using a computer system to employ a plurality of execution threads to perform tasks that the threads identify dynamically, a method that includes:
　A) providing a plurality of task queues, each of which is associated with a different ordered pair of the threads, one thread of the ordered pair being denominated the enqueuer of that queue and the other being denominated the dequeuer thereof, wherein the execution threads operate so that only an enqueuer of a task queue adds entries to that task queue and only the dequeuer of a task queue removes entries from that task queue;
　B) when a thread identifies a task, pushing an identifier of the task thus identified onto a set of at least one of the queues of which that thread is an enqueuer; and
　C) when a thread requires one of the dynamically identified tasks to perform, causing that thread to perform a task identified by a task identifier fetched by that thread from a task queue of which that thread is the dequeuer.

13. A method as defined in claim 12 wherein each said dynamically identified task is the garbage-collection task of performing, for a given object associated with that task, processing that includes identifying in the given object references to other objects and thereby identifying the tasks of performing similar processing for those other objects.

14. A method as defined in claim 12 wherein each said task identifier is an identifier of the object with which the task is associated.

15. A method as defined in claim 14 wherein each said dynamically identified task is the garbage-collection task of performing, for a given object associated with that task, processing that includes identifying in the given object references to other objects and thereby identifying the tasks of performing similar processing for those other objects.

16. A method as defined in claim 14 wherein each said task identifier is a pointer to the object with which the task is associated.

17. A method as defined in claim 12 wherein, when one said thread identifies a task, the computer system pushes an identifier of that thread onto only one of the queues of which that thread is an enqueuer.

18. A method as defined in claim 17 wherein each said dynamically identified task is the garbage-collection task of performing, for a given object associated with that task, processing that includes identifying in the given object references to other objects and thereby identifying the tasks of performing similar processing for those other objects.

19. A method as defined in claim 12 wherein identifiers of tasks successively identified by a given thread are not in general pushed onto the same queue.

20. A method as defined in claim 19 wherein each said dynamically identified task is the garbage-collection task of performing, for a given object associated with that task, processing that includes identifying in the given object references to other objects and thereby identifying the tasks of performing similar processing for those other objects.

21. A method as defined in claim 12 wherein a task queue is provided for each ordered pair of the threads.

22. A method as defined in claim 21 wherein each said dynamically identified task is the garbage-collection task of performing, for a given object associated with that task, processing that includes identifying in the given object references to other objects and thereby identifying the tasks of performing similar processing for those other objects.

23. A storage medium containing instructions readable by a computer system to configure the computer system to employ a plurality of execution threads to perform dynamically identified tasks by:
　A) providing a plurality of task queues, each of which is associated with a different ordered pair of the threads, one thread of the ordered pair being denominated the enqueuer of that queue and the other being denominated the dequeuer thereof, wherein the execution threads operate so that only an enqueuer of a task queue adds entries to that task queue and only the dequeuer of a task queue removes entries from that task queue;
　B) when a thread identifies a task, pushing an identifier of the task thus identified onto a set of at least one of the queues of which that thread is an enqueuer; and
　C) when a thread requires one of the dynamically identified tasks to perform, causing that thread to perform a task identified by a task identifier fetched by that thread from a task queue of which that thread is the dequeuer.

24. A storage medium as defined in claim 23 wherein each said dynamically identified task is the garbage-collection task of performing, for a given object associated with that task, processing that includes identifying in the given object references to other objects and thereby identifying the tasks of performing similar processing for those other objects.

25. A storage medium as defined in claim 23 wherein each said task identifier is an identifier of the object with which the task is associated.

26. A storage medium as defined in claim 25 wherein each said dynamically identified task is the garbage-collection task of performing, for a given object associated with that task, processing that includes identifying in the given object references to other objects and thereby identifying the tasks of performing similar processing for those other objects.

27. A storage medium as defined in claim 25 wherein each said task identifier is a pointer to the object with which the task is associated.

28. A storage medium as defined in claim 23 wherein, when one said thread identifies a task, the computer system pushes an identifier of that thread onto only one of the queues of which that thread is an enqueuer.

29. A storage medium as defined in claim 28 wherein each said dynamically identified task is the garbage-collection task of performing, for a given object associated with that task, processing that includes identifying in the given object references to other objects and thereby identifying the tasks of performing similar processing for those other objects.

30. A storage medium as defined in claim 23 wherein identifiers of tasks successively identified by a given thread are not in general pushed onto the same queue.

31. A storage medium as defined in claim 30 wherein each said dynamically identified task is the garbage-collection task of performing, for a given object associated with that task, processing that includes identifying in the given object references to other objects and thereby identifying the tasks of performing similar processing for those other objects.

32. A storage medium as defined in claim 23 wherein a task queue is provided for each ordered pair of the threads.

33. A storage medium as defined in claim 32 wherein each said dynamically identified task is the garbage-collection task of performing, for a given object associated with that task, processing that includes identifying in the given object references to other objects and thereby identifying the tasks of performing similar processing for those other objects.

34. A computer signal representing a sequence of instructions that, when executed by a computer system, cause the computer system to employ a plurality of execution threads to perform dynamically identified tasks by:
   A) provide a plurality of task queues, each of which is associated with a different ordered pair of the threads, one thread of the ordered pair being denominated the enqueuer of that queue and the other being denominated the dequeuer thereof, wherein the execution threads operate so that only an enqueuer of a task queue adds entries to that task queue and only the dequeuer of a task queue removes, entries from that task queue;
   B) when a thread identifies a task, pushes an identifier of the task thus identified onto a set of at least one of the queues of which that thread is an enqueuer; and
   C) when a thread requires one of the dynamically identified tasks to perform, causes that thread to perform a task identified by a task identifier fetched by that thread from a task queue of which that thread is the dequeuer.

35. A computer signal as defined in claim 34 wherein each said dynamically identified task is the garbage-collection task of performing, for a given object associated with that task, processing that includes identifying in the given object references to other objects and thereby identifying the tasks of performing similar processing for those other objects.

36. A computer signal as defined in claim 34 wherein each said task identifier is an identifier of the object with which the task is associated.

37. A computer signal as defined in claim 36 wherein each said dynamically identified task is the garbage-collection task of performing, for a given object associated with that task, processing that includes identifying in the given object references to other objects and thereby identifying the tasks of performing similar processing for those other objects.

38. A computer signal as defined in claim 36 wherein each said task identifier is a pointer to the object with which the task is associated.

39. A computer signal as defined in claim 34 wherein, when one said thread identifies a task, the computer system pushes an identifier of that thread onto only one of the queues of which that thread is an enqueuer.

40. A computer signal as defined in claim 39 wherein each said dynamically identified task is the garbage-collection task of performing, for a given object associated with that task, processing that includes identifying in the given object references to other objects and thereby identifying the tasks of performing similar processing for those other objects.

41. A computer signal as defined in claim 34 wherein identifiers of tasks successively identified by a given thread are not in general pushed onto the same queue.

42. A computer signal as defined in claim 41 wherein each said dynamically identified task is the garbage-collection task of performing, for a given object associated with that task, processing that includes identifying in the given object references to other objects and thereby identifying the tasks of performing similar processing for those other objects.

43. A computer signal as defined in claim 34 wherein a task queue is provided for each ordered pair of the threads.

44. A computer signal as defined in claim 43 wherein each said dynamically identified task is the garbage-collection task of performing, for a given object associated with that task, processing that includes identifying in the given object references to other objects and thereby identifying the tasks of performing similar processing for those other objects.

45. A computer system that employs a plurality of execution threads to perform tasks that the threads identify dynamically, the computer system including:
   A) means for providing a plurality of task queues, each of which is associated with a different ordered pair of the threads, one thread of the ordered pair being denominated the enqueuer of that queue and the other being denominated the dequeuer thereof, wherein the execution threads operate so that only an enqueuer of a task queue adds entries to that task queue and only the dequeuer of a task queue removes entries from that task queue;
   B) means for, when a thread identifies a task, pushing an identifier of the task thus identified onto a set of at least one of the queues of which that thread is an enqueuer; and
   C) means for, when a thread requires one of the dynamically identified tasks to perform, causing that thread to perform a task identified by a task identifier fetched by that thread from a task queue of which that thread is the dequeuer.

* * * * *